United States Patent
Aoki et al.

(10) Patent No.: US 7,835,476 B2
(45) Date of Patent: Nov. 16, 2010

(54) METHOD FOR RECEIVING OFDM SIGNAL, AND RECEIVER

(75) Inventors: Tsuguhide Aoki, Kawasaki (JP);
Yoshimasa Egashira, Yokohama (JP);
Yasuhiko Tanabe, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 746 days.

(21) Appl. No.: 11/689,121

(22) Filed: Mar. 21, 2007

(65) Prior Publication Data
US 2008/0063120 A1     Mar. 13, 2008

(30) Foreign Application Priority Data
Sep. 12, 2006  (JP) .............................. 2006-247041

(51) Int. Cl.
*H04L 27/06* (2006.01)
(52) U.S. Cl. .................. 375/344; 375/260; 375/340; 370/203; 370/206; 370/208; 370/210
(58) Field of Classification Search .............. 375/260, 375/340, 344
See application file for complete search history.

(56) References Cited

U.S. PATENT DOCUMENTS

2004/0258171 A1*  12/2004  Akita et al. ................. 375/260
2005/0201268 A1    9/2005  Aoki et al.
2006/0209979 A1*   9/2006  Sandell et al. .............. 375/267
2007/0058736 A1*   3/2007  Nguyen et al. .............. 375/260
2010/0014504 A1*   1/2010  Sun et al. .................... 370/345

FOREIGN PATENT DOCUMENTS

JP          2004-312372          11/2004

OTHER PUBLICATIONS

Sean Coffey, et al., "Joint Proposal: High throughput extension to the 802.11, Standard: PHY", IEEE P802.11-05/1102r4, Wireless LANs, Jan. 13, 2006, pp. 1-82.

* cited by examiner

*Primary Examiner*—David C Payne
*Assistant Examiner*—Leon Flores
(74) *Attorney, Agent, or Firm*—Oblon, Spivak, McClelland, Maier & Neustadt, L.L.P.

(57) ABSTRACT

A receiver of an OFDM signal includes a reception unit to receive an OFDM signal formed by a plurality of OFDM symbols respectively including data subcarriers to which data signals are allocated and pilot subcarriers to which cyclically shifted pilot signals are allocated in frequency domain, an estimator to estimate phase errors of the pilot signals to generate first estimated values related to an offset of the OFDM symbol corresponding to each two or more OFDM symbols in the OFDM signal, a weighting adder to perform weighting additions on the first estimated values to obtain one second estimated value related to the offset, a compensator to compensate the offset by using the second estimated value to obtain a compensated OFDM signal, and a decoder to decode the compensated OFDM signal to reproduce the data signals.

12 Claims, 4 Drawing Sheets

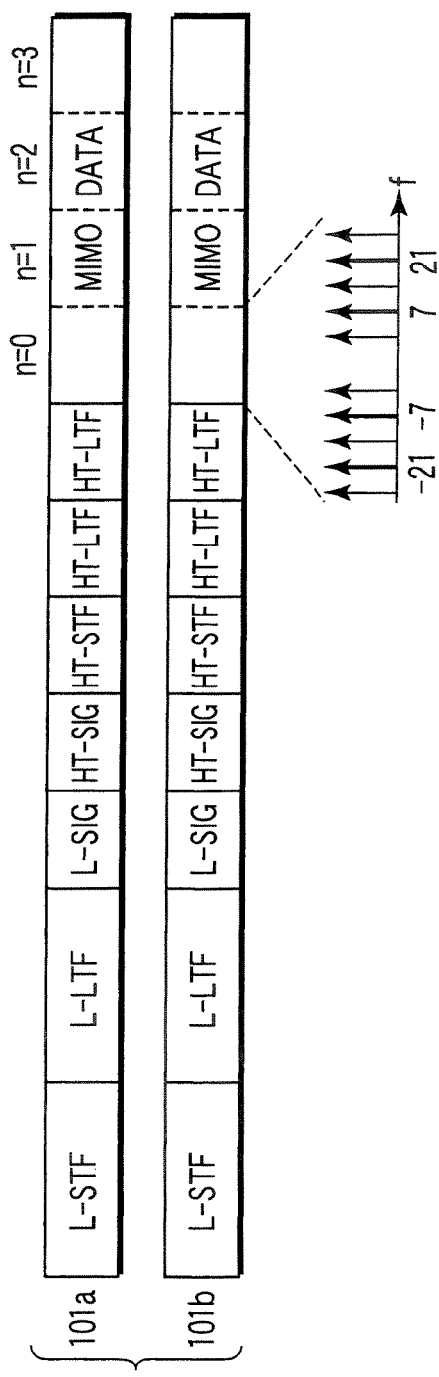
F I G. 2
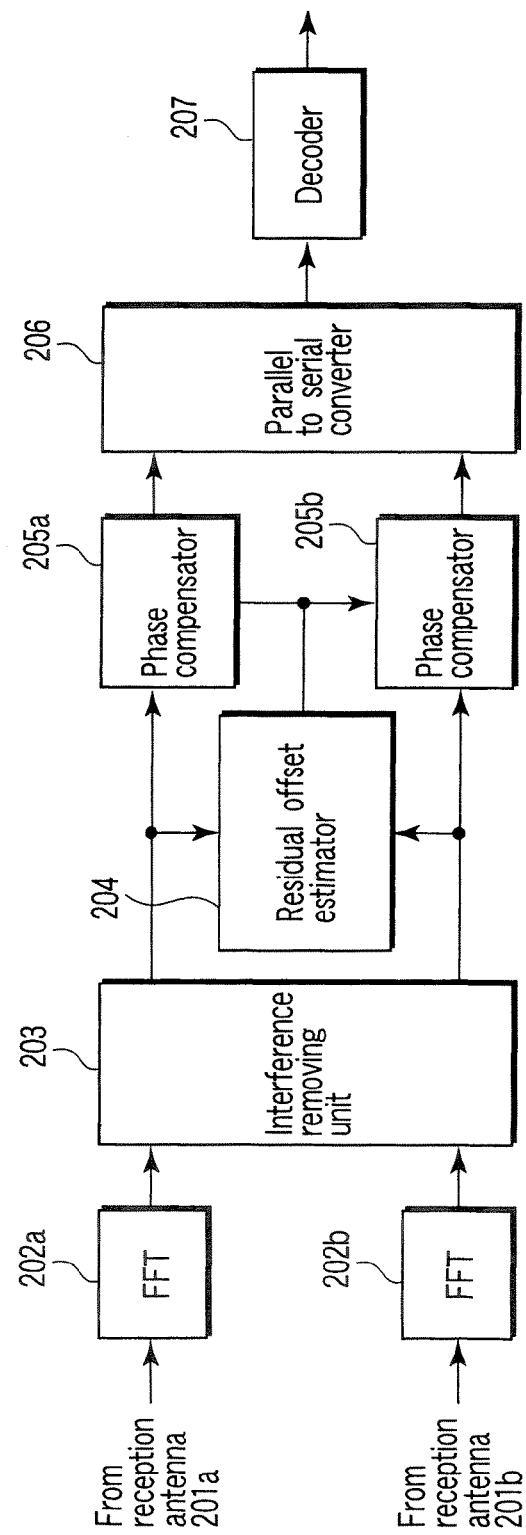
F I G. 3

METHOD FOR RECEIVING OFDM SIGNAL, AND RECEIVER

CROSS-REFERENCE TO RELATED APPLICATIONS

This application is based upon and claims the benefit of priority from prior Japanese Patent Application No. 2006-247041, filed Sep. 12, 2006, the entire contents of which are incorporated herein by reference.

BACKGROUND OF THE INVENTION

1. Field of the Invention

The present invention relates to a method for receiving an OFDM signal, and a receiver.

2. Description of the Related Art

A transmitter of a radio communication system using an orthogonal frequency division multiplexing (OFDM) technique (OFDM communication system) allocates modulated symbols obtained by applying an orthogonal modulation to an information signal to be transmitted to each subcarrier. The transmitter generates an OFDM signal by applying inverse fast Fourier transform (IFFT) to each subcarrier with modulated symbols allocated thereto, and radio-packetizes the OFDM signal to transmit it. On the other hand, a receiver of the OFDM communication system receives the transmitted OFDM signal to demodulate it.

In the receiver, it is necessary to compensate for the carrier offset and clock offset caused by frequency deviations between a crystal oscillator in the transmitter and that of the receiver. The carrier offset is generated in down converting of a received signal in a baseband signal. The clock offset is generated in analog-digital converting the received signal, and results in occurrence of a conversion error in a digital signal.

According to IEEE 802.11a, which is one of the conventional wireless LAN standards, a known signal is inserted in a preamble of the head of a wireless packet. A receiver uses the known signal in a received signal to estimate carrier offset and clock offset to compensate the carrier offset and the clock offset in accordance with the obtained estimated value. However, since the known signal is lost due to noise, estimating and compensating the carrier offset and the clock offset in use of the known signal also poses the problem of a residual offset behind the preamble. To solve such a problem, IEEE 802.11a uses a subcarrier (referred to as pilot subcarrier) of a part of data to transmit a pilot signal, and the receiver uses the received pilot signal to estimate and compensate for the residual offset.

One example of a method for compensating for clock offset by using the pilot signal is disclosed in JP-A 2004-312372 (KOKAI). Angles of phase rotations caused by the clock offset become smaller the closer the subcarriers are to a center frequency, and larger if the subcarriers are more distant from the center frequency. According to FIGS. 15 (A) and (B) in JP-A 2004-312372 (KOKAI), white points represent signal reception points when no clock offset is present, and black points represent phase rotations caused by the clock offset. In contrast, the angles of phase rotations caused by the carrier offset are identical in all pilot subcarriers.

Since the carrier offset and the clock offset occur simultaneously, phase rotations in which influences from the carrier offset and influence from the clock offset are combined occur. Using this occurrence of the phase rotations achieves estimation and compensation of the clock offset by using the received pilot signals in JP-A 2004-312372 (KOKAI).

Meanwhile, a multi input multi output (MIMO) system, using each of a plurality of antennas for a transmitter and a receiver, has received attention in view of its high throughput. Further, a MIMO-OFDM system using both the MIMO and OFDM has been regarded as the most likely next-generation radio communication system. However, transmitting identical pilot signals from a plurality of antennas poses the problem of mutual interference. This interference results in a phenomenon, for instance, in which a strong pilot signal is transmitted in a certain direction, but not in another direction. This phenomenon is called a beam forming influence.

In a draft "Joint Proposal: High throughput extension to the 802.11 Standard: PHY" (Document 1) of IEEE 802.11n, which is a next-generation wireless LAN system in which the MIMO-OFDM system is regarded to be adopted as a standard, devising an idea for transmission patterns of the pilot subcarrier transmitted from a plurality of antennas prevents the influence of beam forming. In pilot subcarrier patterns depicted in Table 17-Pilot values for 40 MHz transmission in Document 1, $N_{sts}$ is the number of all streams transmitted simultaneously (here, read as the number of all transmission antennas), and $i_{sts}$ following the $N_{sts}$ is the number of streams to be actually transmitted (here, read as the number of transmission antennas). Next to the $i_{sts}$, a −21st, a −7th, a +7th, and a +21st pilot subcarriers of transmit signals are transmitted. For instance, if the number of transmission antennas is four, in a 0th OFDN symbol, a 0th transmission antenna transmits a signal with a pattern of (1, 1, 1, −1), a 1st transmission antenna transmits a signal with a pattern of (1, 1, −1, 1), a 2nd transmission antenna transmits a signal with a pattern of (1, −1, 1, 1), and a 3rd transmission antenna transmits a signal of a pattern (−1, 1, 1, 1).

Here, a pilot subcarrier, for example, a −21st subcarrier is considered. The −21st pilot subcarrier simultaneously transmits signals with patterns of (1, 1, 1, −1) from four transmission antennas. This pattern differs from that of a signal transmitted through another pilot subcarrier. Especially, when the number of transmission antennas is four, a pattern of a signal transmitted from a certain pilot subcarrier is orthogonal to a pattern of a signal transmitted from another pilot subcarrier. Therefore, even if the receiver is present in a null direction of a transmission beam formed of a −7th, a +7th and a +21st pilot subcarrier, a possibility that a transmission beam formed of a −21st pilot subcarrier reaches the receiver becomes high.

In general, a signal transmitted from a transmitter generates reflection diffraction by a feature. If reflection diffraction is generated, the receiver receives the signal transmitted from one transmitter as a plurality of signals via a plurality of paths, so that the envelope of the received signal varies depending on the place and time (referred to as fading). If fading has occurred, even if the transmission beam formed of a pilot subcarrier (in an example given above, −21st pilot subcarrier) is directed in the direction of the receiver, the influence of fading lowers the received power of the −21st, −7th, +7th and +21st pilot subcarriers sometimes. As a result, in the forgoing situation in which the receiver is located in the null direction of the transmission beam formed of the −7th, +7th and +21st pilot subcarriers, there is a possibility that the electric power of the +21st pilot subcarrier received will be lowered. Thereby, the receiving performance of the receiver greatly drops.

As explained above, the combination between the offset compensation technique disclosed in JP-A 2004-312372 (KOKAI) and the pilot subcarrier pattern described in Document 1 cannot receive the pilot signals to compensate for the offset, and deteriorates the reception performance sometimes.

BRIEF SUMMARY OF THE INVENTION

An object of the present invention is to enable estimation and compensating an offset of the OFDM symbol which is hardly influenced by fading in receiving an OFDM signal.

One aspect of the present invention provides a receiver of an OFDM signal comprising: a reception unit to receive an OFDM signal formed by a plurality of OFDM symbols respectively including data subcarriers to which data signals are allocated and pilot subcarriers to which cyclically shifted pilot signals are allocated in frequency domain; an estimator to estimate phase errors of the pilot signals to generate first estimated values related to an offset of an OFDM symbol corresponding to each two or more OFDM symbols in the OFDM signal; a weighting adder to perform weighting additions on the first estimated values to obtain one second estimated value related to the offset; a compensator to compensate the offset by using the second estimated value to obtain a compensated OFDM signal; and a decoder to decode the compensated OFDM signal to reproduce the data signals.

BRIEF DESCRIPTION OF THE SEVERAL VIEWS OF THE DRAWING

FIG. 2 is an exemplary view depicting examples of wireless packets transmitted from reception antennas in FIG. 1;

FIG. 3 is an exemplary block diagram depicting a main part of a receiver in FIG. 1;

DETAILED DESCRIPTION OF THE INVENTION

Figures 1, 4:
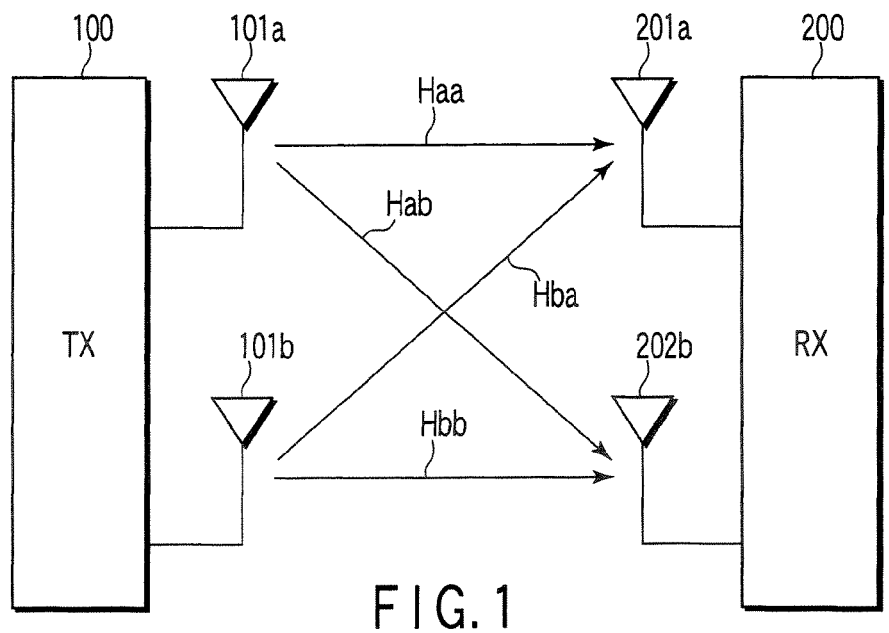
FIG. 1 is an exemplary block diagram depicting a radio communication system according to an embodiment.
FIG. 4 is an exemplary view depicting pilot signals transmitted at each time from transmission antennas in FIG. 1.

Referring now to FIG. 1, in a MIMO-OFDM communication system presumed in one embodiment of the present invention, a transmitter 100 having two transmission antennas 101a and 101b makes transmissions toward a receiver 200 having two reception antennas 201a and 202b. Haa represents a channel response from the transmission antenna 101a to the reception antenna 201a, Hab represents a channel response from the transmission antenna 101a to the reception antenna 202b, Hba represents a channel response from the transmission antenna 101b to the reception antenna 201a, and Hbb represents a channel response from the transmission antenna 101b to the reception antenna 202b, respectively.

In general, in a multipath channel (multipath propagation path), values in channel responses differ from one another for each subcarrier of an OFDM signal. Here, for purpose of simplification, it is presumed that the channel responses have identical values for each subcarrier.

As illustrated in FIG. 2, the configuration of wireless packets transmitted from the transmission antennas 101a and 101b in FIG. 1 is the same as that proposed in IEEE 802.11n, described in Document 1. In FIG. 2, an STF represents a short training field, an LTF represents a long training field, and an SIG represents a signal field. "L-" means legacy, and fields with "L-" represent ones compliant to the wireless LAN standard (IEEE 802.11a or IEEE 802.11g). "HT-" is a short for high throughput, and the fields with the "HT-" represent ones peculiar to the next-generation wireless LAN standard.

After receiving L-STFs to detect wireless packets, the receiver applies automatic gain control (AGC) by using a variable gain amplifier (VGA) to the received signal then performs gain control so that the amplitude of the received signal is within an input dynamic range of an analog to digital converter (ADC) in the next stage of the VGA. Since packet detection and the AGC function are well-known techniques, their detailed descriptions will be skipped.

Next, the receiver 200 estimates frequency offset to perform compensation (coarse adjustment) of the frequency offset on the basis of the estimation, and further, detects the boundary between the L-STF and L-LTF in the use of a timing synchronizing function. Subsequently, the receiver 200 performs channel estimation and fine adjustment of the frequency offset by using the L-LTF. The coarse adjustment and the fine adjustment for the frequency offset are well-known techniques, thus explanations about such will be omitted.

If the offset estimation is performed in a state that it is buried in noise, even after compensating the L-STF and the L-LTF, the estimation results in generation of a residual offset. In the case of temporal variations of an offset value, it is impossible for the L-STF and the L-LTF to compensate for the variations.

FIG. 3 illustrates the configuration following the synchronous processing unit of the receiver 200. The L-SIG and the HT-SIG in FIG. 2 are output from both the reception antennas 201a and 201b. The signals output from the reception antennas 201a and 201b are transmitted to fast Fourier transform (FFT) units 202a and 202b to be applied with FFT. The signals after being applied with FFT are input to an interference removing unit 203.

Here, the signals in the sections from the L-STF to the HT-SIG in FIG. 2 (namely, sections from L-STF, L-LTF, L-SIG, and HT-SIG) are the same in the wireless packets respectively transmitted from the two antennas 101a and 101b, and the signals are transmitted in the cyclic shift system. In this system, the other antenna transmits the signal that is the signal which has been transmitted from one antenna and has been temporally and cyclically shifted. In other words, in the section between the L-STF to the HT-SIG, the two transmission antennas 101 and 101b transmit a common signal, but the transmission timings differ from each other due to the cyclic shift. If the number of the kinds of the transmission signals at this moment is defined as "stream number", the number of the signal streams from the L-STF to the HT-SIG is one. After the HT-STF and the HT-STF, two transmission antennas 201 and 21b respectively transmit independent signals, therefore the number of streams become two.

Like this, in the section from the L-STF to the HT-SIG, the transmitting signals from the transmission antenna 101a being cyclically shifted and being transmitted from another transmission antenna 101b, the transmitting signals from the transmission antenna 101a and that from the transmission antenna 101b are the signals of basically single streams. Therefore, the interference removing unit 203 operates as a maximum ratio combining unit in the section from the L-STF to the HT-SIG, and the interference removing unit 203 combines the signals received by the reception antennas 201a and the 201b to form a single output signal.

After phase-compensating by either a phase compensator 205a or a phase compensator 205b, the output signal from the interference removing unit 203 is input to a decoder 207 through a parallel-serial (P-S) converter 206 to a decoder 207. At this moment, the signal input to the phase compensator 205a or 205b is of the single stream, and phase compensation can be achieved by a well-known technique, such as that described in JP-A 2004-312372 (KOKAI), thus no explanation will be given of this here.

The L-SIG and the HT-SIG describe additional information on modulation systems of data sections (MIMO DATA), on data lengths, on the number of the transmission antennas, etc., and the receiver 200 decodes the L-SIG and the HT-SIG to enable the additional information to be understood.

Subsequently, in the HT-STF section, AGC to receive the HT-LTF and the MIMO DATA is implemented. After this, in the HT-LTF section, the receiver 200 estimates channel responses (channel estimation) from the transmission antennas 101a and 101b to the reception antennas 201a and 201b. Well known techniques can be used for AGC and the channel estimation, thus their descriptions will be omitted.

Using the values of the channel responses estimated in the manner given above may express a received signal RXa output from the reception antenna 202 and a received signal RXb output from the reception antenna 202b during the reception of the MIMO DTA in the following equation.

$$\begin{bmatrix} RXa \\ RXb \end{bmatrix} = \begin{bmatrix} Haa & Hba \\ Hab & Hbb \end{bmatrix} \begin{bmatrix} TXa \\ TXb \end{bmatrix} \quad (1)$$

Wherein, TXa and TXb represent transmitting signals from the transmission antennas 101a and 101b, respectively.

The interference removing unit 203 multiplies an inverse matrix of a matrix formed of transfer functions Haa, Hab, Hba, and Hbb of the received signals Rxa and Rxb to demodulate the transmitting signals TXa and TXb. The demodulated signals are expressed by TXa' and TXb'.

In the data section (MIMO DATA), as indicated at the position of n=0 in FIG. 2, the pilot subcarriers, indicated by thick arrows, are multiplexed. In a 20 MHz mode of IEEE 802.11n, for example, the −21st, −7th, +7th, and +21st subcarriers are used as the pilot subcarriers. The receiver 200 uses the signals of the pilot subcarriers in the received signals to compensate for the carrier offset and the clock offset of an offset of the OFDM symbol.

The demodulated signals TXa' and TXb' output from the interference removing unit 203 are input to the residual offset estimator 204, and the phase compensators 205a and 205b. The signals of the pilot subcarriers in the demodulated signals TXa' and TXb' are input to the residual offset estimator 204 then the residual offset components, i.e., the phase below-mentioned phase errors of the received pilot signals are estimated. After removing the interference, the signals of the data subcarriers in the demodulated signals TXa' and TXb' are input to the phase compensators 205a and 205b to be compensated for the carrier offset and clock offset, and decoded through the decoder 207. In FIG. 3, the phase compensators 205a and 205b are arranged behind the interference removing unit 203, though a single phase compensator may be arranged in front of the interference removing unit 203.

In IEEE 802.11n described in Document 1, the pilot signals are cyclically transmitted. FIG. 4 schematically illustrates the pilot signals in the case that the transmitter 100 has two transmission antennas. In the MIMO DATA, as shown in FIG. 4, at the time of n=0, the transmission antenna 101a transmits a pilot signal (1, 1, −1, −1) though the pilot subcarriers (−21st, −7th, +7th, and +21st subcarriers), and the transmission antenna 101b transmits the pilot signal (1, −1, −1, 1) through the same pilot subcarriers.

Here, if it is presumed that "m" is the number of two pilot subcarriers, "M" is the total number of pilot subcarriers (in this example, M=4), "k" and "l" refer to the number of space streams, and $P_{k,m}$ and $P_{l,m}$ are a certain two pilot signals, the pilot signals in FIG. 4 are expressed by the following equation.

$$\sum_{m=1}^{M} p_{k,m} p_{l,m} = \alpha \delta_{k-l} \quad (2)$$

Here, δ is a delta function, and only 50 represents "1", and represents "0" except in the case given above. For example, if "k"="0 (zero)" and "l"="1 (one)", the equation (2) is expressed by the following equation.

$$\sum_{m=1}^{M} p_{0,m} p_{1,m} = \alpha \delta_{-1} = 0 \quad (3)$$

The equation (3) represents the inner product of the pilot signal (1, 1, −1, −1) transmitted from the transmission antenna 101a and the pilot signal (1, −1, −1, 1) transmitted from the transmission antenna 101b, so that it clearly becomes equal to "0". That is, the equation (2) expresses that the pilot signals respectively transmitted through the two streams from the transmission antennas 101a and 102b at the time t=0 cross at a right angle to each other on the frequency axis.

On the other hand, an the time n=1, the pilot signals are transmitted through the pilot subcarriers of which the frequencies are shifted to the right sides in FIG. 4 in comparison to the case of the time n=0. More specifically, the pilot signal which has been transmitted by the −21st subcarrier at the time n=0 is transmitted by the −7th pilot subcarrier at time n=1. In a similar way, the pilot signal which has been transmitted by the −7th pilot subcarrier at time n=0 is transmitted by the +7th pilot subcarrier at time n=1.

Here, the pilot signals $P_{k,m}(n)$ to be transmitted through the m-th pilot subcarrier of the k-th space stream of the n-th OFDM symbol are expressed by the following equation by using $P_{k,m}$ (or $P_{l,m}$)

$$P_{k,m}(n) = p_{k,(n+m) \bmod N} \quad (4)$$
$$= p_{k,(n+m) \bmod 4}$$

wherein, (n+m) mod N represents the residue when (n+m) is divided by N (in this example, N=4), i.e., mod is a modulo operator. For instance, in the equation (4), in the case of n=0 and N=4, (n+m) mod N become "m" and the right side of the equation (4) becomes $P_{k,m}$. If n=1, the right side becomes $P_{k,m+1}$, and the pilot signal $P_{k,m}$ results in a cyclic shift by one cycle toward the right.

Next, the operations of the residual offset estimator 204 will be described by referring to FIG. 5. White circles in FIG. 5 indicate each input signal to the residual offset estimator 204 corresponding to a certain pilot subcarrier. Arrows are vectors indicating the channel estimated values of Haa and Hba.

At the time n=0, after the −21st subcarriers have transmitted "1" from both the transmission antennas 101a and 101b, the reception antenna 201a receives the pilot signal r(0)= (Haa+Hba)exp(2πjθ). The exp(2πjθ) expresses a phase rotation due to residual carrier offset and clock offset. For the purpose of simplification, noise components are not depicted.

On the other hand, at the HT-LTF just before the MIMO DATA, the channel estimated value corresponding to the pilot subcarrier is known, and the pilot signal pattern shown in FIG. 4 is also known. Therefore, a replica pilot signal r'(0)=Haa+Hba of the pilot signal with no offset may be generated.

Next, the residual offset estimator 204 estimates the phase difference between the actually received pilot signal r(0) and the replica r'(0) generated from the channel estimated value as the residual offset (phase error of pilot signal). The estimator 204 performs this estimation by performing, for instance, division between the pilot signals r(0) and r'(0), or complex multiplication between the pilot signals r(0) and r'(0). It is supposed that the estimated value of the phase difference is θ'(0). In the case of complex multiplication, the estimated value θ'(0) is expressed by the following equation.

$$\theta'(0) = \arg(r(0)r^*(0)) \qquad (5)$$
$$= \theta$$

As mentioned above, the transmission beams generated by the −21st, −7th, +7th, and 21st pilot subcarriers are headed to various directions. Therefore, even if there is a pilot subcarrier headed in the direction of the receiver 200, the reception level may be deeply dropped due to the influence of the fading caused by the reflectors or scatterings near the receiver 200, the received power may be small, as in the case of the time n=0 in FIG. 4, and there is a possibility that the reception signal has been buried in noise at the point close to the origin. In such a case, the receiver 200 cannot receive any of the +21st, −7th, +7th, and +21st pilot subcarriers, which results in a deterioration of reception performance of the receiver 200.

Figure 5:
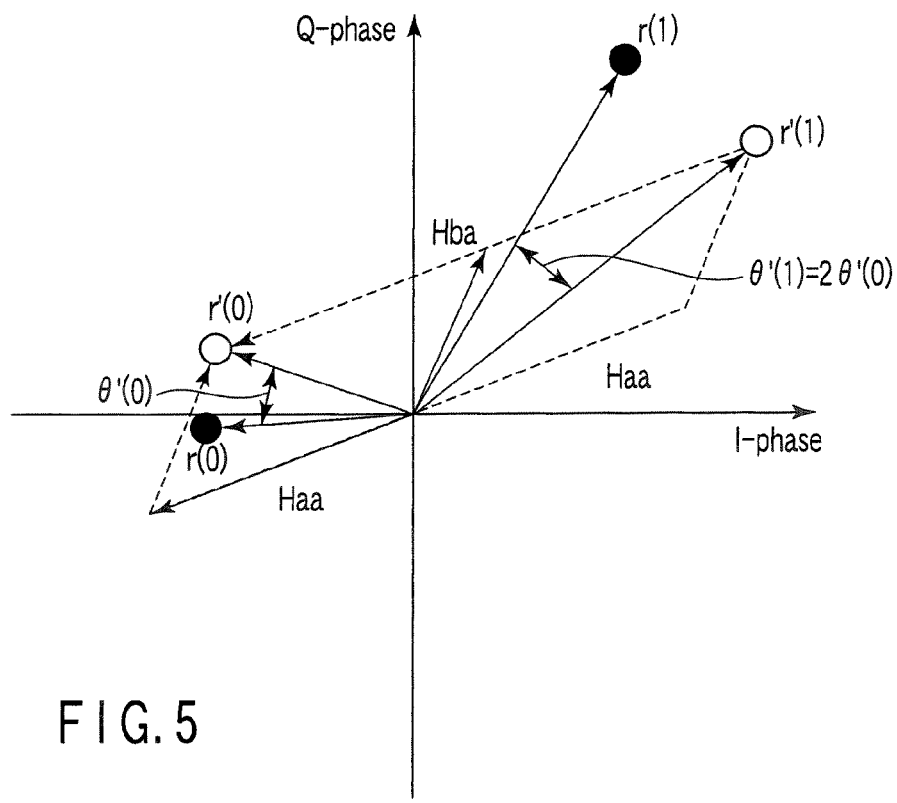
FIG. 5 is an exemplary view for explaining operations of a residual offset estimator in FIG. 3.

In contrast, at the time n=1, the transmission antenna 101a is transmitting "−1" and the transmission antenna 101b is transmitting "1", and the reception antenna 201a receives a pilot signal r(1)=(-Haa+Hba)*exp(2πj2θ) As is clear from FIG. 5, the electric power of the received signal varies in comparison to that of the pilot signal r(0). In this case, the received power of the pilot signal r(1) increases in comparison to the pilot signal r(0). In an actual communication environment, of signals transmitted from a plurality of antennas, final propagation path of the signals transmitted from plurality of antennas are frequently modeled by the product of the influence on a transmission path on a transmission side and the influence on a transmission path on a reception side. Therefore, even in an environment in which the transmitted beam received signal strongly achieves due to the influence of the transmission path on the transmission side, the signal level is reduced due to the influence from the transmission path on the reception side. However, this modeling is complicated, so the radio communication system in this embodiment uses a equation simulating only the influence from the transmission path on the transmission side.

Next, an estimated value θ'(1) of the phase difference between the pilot signals r(1) and r'(1) is calculated. Using complex multiplication, the estimated value θ'(1) of the phase difference is expressed by the following equation.

$$\theta'(1) = \arg(r(1)r^*(1)) \qquad (6)$$
$$= 2\theta$$

In this case, due to being deviated twice as compared with the estimate time at n=0, there is a relation of θ'(1)=2θ'(0) if the influence of noise is disregarded.

It is possible to estimate and correct the carrier offset and clock offset as disclosed in US 2005-0281240 A1 by using either of the estimated value θ'(0) of the phase difference at the time n=0, or the estimated value θ'(1) of the phase difference at the time n=1. However, in the embodiment, the characteristics of the communication system are improved by estimating and correcting the carrier offset and clock offset in use of the estimated values θ'(0) and θ'(1) which can be obtained at both time n=0 and n=1.

The signals respectively transmitted from the transmission antennas 101a and 101b through the −21st pilot subcarriers have the same amplitude and also same phase at the time n=0, but they have an inverse phase at the time n=1. Therefore, the transmitting beam formed by the pilot subcarrier at the time n=0, and the transmitting beam formed by the pilot subcarrier at the time n=1 differ from each other. Accordingly, using the estimated values θ' (0) and θ' (1) obtained at both the times n=0 and n=1 enables obtaining diversity effect because there is a possibility for the one of the estimated values θ'(0) and θ'(1) to increase in received power even when other is buried in noise.

To combine the estimated values θ'(0) and θ'(1) of the phase difference obtained at both the times n=0 and n=1, the receiver 200 may apply weighting addition in accordance with, for instance, the following equation.

$$\theta' = \arg(r(0)r^*(0) + r(1)r^*(1))/3 \qquad (7)$$

If the level of the received signal is high, the pilot signals r(0)r*(0) and r(1)r*(1) being also large, by applying maximum ratio combining to the estimated value θ'(1) obtained at the time n=0 and to the estimated value θ'(1) obtained at the time n=1 in the equation (7), the final estimated value θ' is defined. Maximum ratio combining is, as known well, a method for applying weighting addition to a plurality of signals by using weighting functions in response to the level of each signal. It is acceptable to define the final estimated value by use of weighting addition other than that using maximum ratio combining. It is also possible to select the estimated value at the time point when the reception level is high in the estimated values θ'(0) and θ'(1) without applying such maximum ratio combining.

Figure 6:
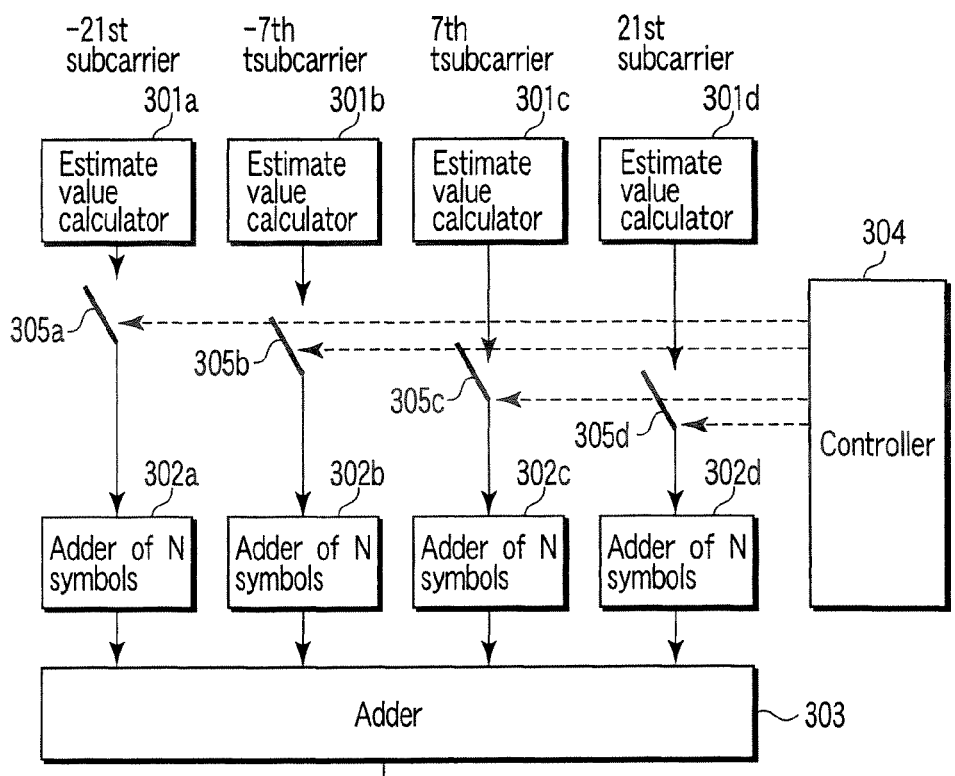
FIG. 6 is an exemplary block diagram depicting an example of the residual offset estimator.

Hereinafter, the residual offset estimator 204 will be described in detail with reference to FIG. 6. According to an example of the residual offset estimator shown in FIG. 6, estimated value calculators 301a to 301d calculate according to the formula (6). Here, four subcarriers of the −21st, −7th, +7th, and +21st being used as the pilot subcarriers, the estimated value calculators 301a to 301d are disposed in response to each pilot subcarrier, but one estimator may be used in a time division manner for the calculators 301a to 301d.

The estimated values respectively obtained by the calculators 301a to 301d are applied weighting addition corresponding to N OFDM symbols through adders 302a to 302d. Here, two estimated values obtained at the times n=0 and n=1 are added after multiplied weights (N=2). To further enhance estimate precision, four estimated values obtained from the adders 302a to 302d are added, to produce final estimated values. It is also acceptable not to apply weighting addition to all estimated values in this manner, but to select only values of which the reception level has been high among the four estimated values through selector switches 305a to 305d controlled by a controller 304 to obtain the final estimated values.

In finally estimating and compensating by using both estimated values at the times n=0, and n=1, processing for estimation and compensation delays by one OFDM symbol. However, regarding the offset in the data section (MIMO DATA), which is the residual part that was not removed in the preamble, the processing delay to an extent of one OFDM symbol does not pose a practical problem.

On the other hand, it is possible to use the method of using the estimated values from the time n=0 to n=3 to do the pilot pattern may come back by four OFDM symbols as shown in FIG. 4. However, if all the patterns at the time n=2 are reversed, the patterns becomes as those at the time n=0, and if the patterns at the time n=4 are reversed, the patterns becomes the same as those at the time n=1, so that weighting addition by at least two OFDM symbols is enough.

In contrast, as shown in table 17 in Document 1, if the total number of transmission antennas is three or four, it is preferable to estimate the residual offset by using the estimated values by four OFDM symbols, because the cycle rounds by 4OFDM symbol.

Figure 7:
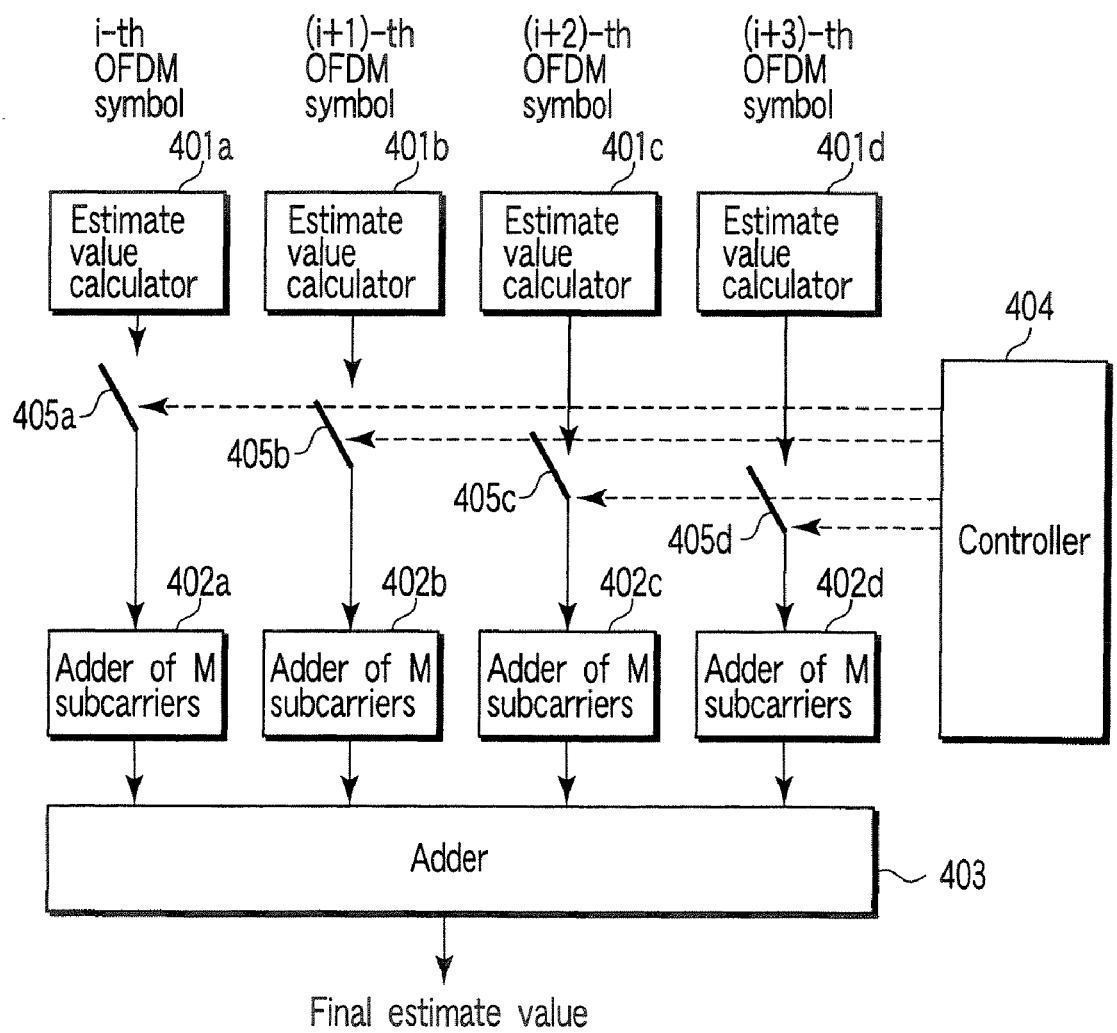
FIG. 7 is an exemplary block diagram depicting another example of the residual offset estimator.

According to an example of the residual offset estimator 204 depicted in FIG. 7, the estimated value calculators 401a to 401d calculate, for example, the equations (5) and (6) in response to the four OFDM symbols of an i-th, (i+1)-th, (i+2)-th, and (i+3)-th. Here, since the estimated value calculators 401a to 401d are disposed in response to the i-th, (i+1)-th, (i+2)-th, and (i+3)-th of four OFDM symbols, it is acceptable to use one estimator in a time division manner for the estimated value calculators 401a to 401d.

The estimated values respectively obtained by the estimated value calculators 401a to 401d are applied with weighting addition processing by M OFDM symbols by means of the adders 402a to 402d. Here, after multiplying the weight for each of the estimated value θ'(0) and the estimated value θ'(0) obtained at the times n=0 and n=1, respectively, they are added to each other (M=2). To enhance the estimate precision, the adder 403 adds the four estimated values obtained from the adders 402a to 402d, and produces the final estimated values. It is also preferable not to apply weighting addition to all estimated values in the manner given above, but to select only the values of which the reception levels are high among four estimated values by means of the switches 405a to 405d controlled by the controller 404, to obtain the final estimated values.

A method for estimating the carrier offset and clock offset in the use of the phase differences obtained by a plurality of pilot subcarriers will be set forth below. It is presumed that the estimated values of the phase differences to be obtained by the −21st, −7th, +7th, and +21st pilot subcarriers are defined $\theta_{-21}$, $\theta_{-7}$, $\theta_{+7}$, and $\theta_{+21}$, respectively. Each estimated value $\theta_{-21}$, $\theta_{-7}$, $\theta_{+7}$, and $\theta_{+21}$ is calculated in a manner described above. Here, as mentioned above, the carrier offset does not vary due to the subcarriers, and the clock offset has a different value depending on the subcarriers, so that the next equations are established.

$\theta_{-12} = -21\alpha + \beta$ $\theta_{-7} = 7\alpha + \beta$ $\theta_{+7} = +7\alpha + \beta$ $\theta_{+21} = +21\alpha + \beta$ (8)

where, α is a value of clock offset, and β is the value of the carrier offset.

It is possible to estimate α and β in the use of these four equations. Calculating α and β may be performed by using a least-squares error criterion. However, they can be more simply obtained by the following equations:

$$\beta = \theta_{-21} + \theta_{-7} + \theta_{+7} + \theta_{+21} \quad (9)$$
$$\alpha = \frac{\beta - \theta_{-7}}{7}$$

In the foregoing description, α and β are calculated by calculating the phases from r(0)r*(0), but it is also possible to calculate them by using the value of r(0)r*(0) itself. This method is described in, for instance, "Maximum likelihood tracking algorithms for MIMO-OFDM," in Proc. Intern. Conf. Commun., vol. 4, (Paris, France), pp. 2468-2472, June 2004, by C. Oberli, et al., (Document 2), and "Joint weighted least-squares estimation of carrier-frequency offset and timing offset for OFDM systems over multipath fading channels," IEEE Trans. Vehic. Technol., vol. 54, pp. 211-223, January 2005, by P.-Y. Tsai, et al. (Document 3). The methods in Documents 2 and 3 calculate α and β with use of "phase differences obtained for a plurality of pilot subcarriers". According to the embodiment, by expanding the calculations performed in Documents 2 and 3 so as to estimate by use of the "phase differences obtained for a plurality of pilot subcarriers at a plurality of time points" method, the methods disclosed in the forgoing Documents 2 and 3 become applicable.

Thus, after estimating α and β, next, the method calculates the estimated values $\theta_{-21}$, $\theta_{-7}$, $\theta_{+7}$, and $\theta_{+21}$ (phase differences at each subcarrier) by substituting the α, and β into the equation (9). The phase compensators 205a and 205b multiply the outputs from each subcarrier by the inverse characteristics of each $\theta_{-21}$, $\theta_{-7}$, $\theta_{+7}$, and $\theta_{+21}$ then compensate the phases. Specifically, the compensators 205a and 205b compensate the phases so that the points indicated by the black circles come to the points indicated by the white circles in FIG. 5. Here, there is also no need to use the estimated values at all of the pilot subcarriers, and it is also possible to select only the estimated values at the time points at which the received electrical power is large to estimate the final α and β.

As disclosed in US 2005-0281240 A1, the carrier offset depends on the carrier frequency of the radio communication system, and the clock offset depends on the bandwidth of the radio communication system. In general, the carrier frequency is usually larger than the bandwidth. For instance, in IEEE 802.11a and IEEE 802.11n, the carrier frequencies are 5 GHz, and the bandwidths are 20 MHz, respectively. In this case, the clock offset is smaller by 250 times in comparison to the carrier offset. Thus, the contribution of α is much smaller than that of β.

Further, the contribution of β is the same in the phase differences of each subcarrier. Therefore, regarding, for example, the carrier offset, it is possible to individually estimate and compensate at each time point of n=0, or n=1, and, regarding the clock offset, it is possible to estimate by using the estimated values at a plurality of symbols, such as n=0, and n=1. Thereby, as to the carrier offset to significantly rotate phases, the receiver estimates and compensates for every symbol so as to follow the significant rotations. In contrast, as to the clock offset to rotate the phase less, the receiver improves the estimate precision by use of the estimated values obtained at a plurality of symbols to calculate the final estimated values, and compensates the offset by using the estimated values. By compensating in this manner, the reception performance of the receiver may be greatly improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for receiving an Orthogonal Frequency Division Multiplexed (OFDM) signal, comprising:
   receiving an OFDM signal formed by a plurality of OFDM symbols respectively including data subcarriers to which data signals are allocated and pilot subcarriers to which pilot signals are allocated, where signal values of the pilot signals are cyclically shifted in frequency domain for each OFDM symbol;
   estimating phase errors of the pilot signals to generate first estimated values related to a phase offset of an OFDM symbol corresponding to each two or more OFDM symbols in the OFDM signal;
   performing weighting additions on the first estimated values to obtain one second estimate related to the offset;
   compensating the offset by using the second estimated value to obtain a compensated OFDM signal; and
   decoding the compensated OFDM signal to reproduce the data signals,
   wherein
   the OFDM signal is configured so that pilot signals $P_{k,m}$ and $P_{l,m}$ transmitted by m-th pilot subcarriers on frequency axes of a k-th and an l-th pilot subcarriers, respectively, satisfy the following equation:

$$\sum_{m=1}^{M} p_{k,m} p_{l,m} = \alpha \delta_{k-l}$$

where M is a number of the pilot subcarriers, α is an arbitrary complex number, and δ is a delta function,
   the pilot signals $P_{k,m}$ and $P_{l,m}$ are respectively configured each one OFDM symbol of the OFDM signal and with a period of N (N is integer two or more) OFDM symbols, and
   estimating the phase errors generates N pieces of first distortion estimated values corresponding to each N OFDM symbols.

2. A method for receiving an Orthogonal Frequency Division Multiplexed (OFDM) signal, comprising:
   receiving an OFDM signal formed by a plurality of OFDM symbols respectively including data subcarriers to which data signals are allocated and pilot subcarriers to which pilot signals are allocated, where signal values of the pilot signals are cyclically shifted in frequency domain for each OFDM symbol;
   estimating phase errors of the pilot signals to generate first estimated values related to a phase offset of an OFDM symbol corresponding to each two or more OFDM symbols in the OFDM signal;
   selecting one estimated value corresponding to a larger reception level of a receiver from the estimated values to obtain one second estimate related to the offset;
   compensating the offset by using the second estimated value to obtain a compensated OFDM signal; and
   decoding the compensated OFDM signal to reproduce the data signals,
   wherein the OFDM signal is configured so that pilot signals $P_{k,m}$ and $P_{l,m}$ transmitted by m-th pilot subcarriers on frequency axes of a k-th and an l-th pilot subcarriers, respectively, satisfy the following equation:

$$\sum_{m=1}^{M} p_{k,m} p_{l,m} = \alpha \delta_{k-l}$$

where M is a number of the pilot subcarriers, α is an arbitrary complex number, and δ is a delta function,
   the pilot signals $P_{k,m}$ $P_{l,m}$ are respectively configured to be cyclically shifted for each one OFDM symbol of the OFDM signal and with a period of N (N is integer two or more) OFDM symbols, and
   estimating the phase errors generates N pieces of first distortion estimated values corresponding to each N OFDM symbols.

3. A receiver of an Orthogonal Frequency Division Multiplexed (OFDM) signal, comprising:
   a reception unit to receive an OFDM signal formed by a plurality of OFDM symbols respectively including data subcarriers to which data signals are allocated and pilot subcarriers to which pilot signals are allocated, where signal values of the pilot signals are cyclically shifted in frequency domain for each OFDM symbol;
   an estimator to estimate phase errors of the pilot signals to generate first estimated values related to a phase offset of an OFDM symbol corresponding to each two or more OFDM symbols in the OFDM signal;
   a weighting adder to perform weighting additions on the first estimated values to obtain one second estimated value related to the offset;
   a compensator to compensate the offset by using the second estimated value to obtain a compensated OFDM signal; and
   a decoder to decode the compensated OFDM signal to reproduce the data signals,
   wherein the OFDM signal is configured so that pilot signals $P_{k,m}$ and $P_{l,m}$ transmitted by m-th pilot subcarriers on frequency axes of a k-th and an l-th pilot subcarriers, respectively, satisfy the following equation:

$$\sum_{m=1}^{M} p_{k,m} p_{l,m} = \alpha \delta_{k-1}$$

where M is a number of the pilot subcarriers, α is an arbitrary complex number, and δ is a delta function,
   the pilot signals $P_{k,m}$ and $P_{l,m}$ are respectively configured to be cyclically shifted for each one OFDM symbol of the OFDM signal and with a period of N (N is integer two or more) OFDM symbols, and
   the estimator is configured to generate N pieces of first distortion estimated values corresponding to each N OFDM symbols.

4. The receiver according to claim 3, wherein
   the OFDM signal is configured so that a pilot signal of a k-th OFDM symbol is expressed by the following equation:

$$P_{k,m}(n) = P_k(n+m) \bmod N$$

where N is a period of a cyclic shift of the pilot subcarrier, and the estimator is configured to generate an estimated value of a clock offset that is one of the phase offsets corresponding to N OFDM symbols, or corresponding to integral multiples of N, as the first estimated value.

5. The receiver according to claim 3, wherein the second estimated value is generated for each data subcarriers and pilot subcarriers of the received OFDM signal, and
the compensator is configured to compensate a carrier offset that is a phase offset estimated by using the second estimated value.

6. The receiver according to claim 3, wherein the second estimated value is generated for each data subcarriers and pilot subcarriers, and
the compensator is configured to compensate a clock offset that is a phase offset estimated by using the second estimated value.

7. The receiver according to claim 3, wherein the second estimated value is generated for each data subcarriers and pilot subcarriers, and
the compensator is configured to compensate a clock offset that is a phase offset estimated by using the second estimated value, and further compensate a carrier offset that is another phase offset estimated by phase errors of the data subcarriers and the pilot subcarriers, for each one OFDM symbol.

8. A receiver of an orthogonal frequency division multiplexed (OFDM) signal, comprising:
a reception unit to receive an OFDM signal formed by a plurality of OFDM symbols respectively including data subcarriers to which data signals are allocated and pilot subcarriers to which pilot signals are allocated, where signal values of the pilot signals are cyclically shifted in frequency domain for each OFDM symbol;
an estimator to estimate phase errors of the pilot signals to generate first estimated values related to a phase offset of an OFDM symbol corresponding to each two or more OFDM symbols in the OFDM signal;
a selector to select one estimated value corresponding to a larger reception level of the receiver from the estimated values to obtain one second estimate related to the offset;
a compensator to compensate the offset by using the second estimated value to obtain a compensated OFDM signal; and
a decoder to decode the compensated OFDM signal to reproduce the data signals,
wherein the OFDM signal is configured so that pilot signals $P_{k,m}$ and $P_{l,m}$ transmitted by m-th pilot subcarriers on frequency axes of a k-th and an l-th pilot subcarriers, respectively, satisfy the following equation:

$$\sum_{m=1}^{M} p_{k,m} p_{l,m} = \alpha \delta_{k-1}$$

where M is a number of the pilot subcarriers, $\alpha$ is an arbitrary complex number, and $\delta$ is a delta function,
the pilot signals $P_{k,m}$ and $P_{l,m}$ are respectively configured to be cyclically shifted for each one OFDM symbol of the OFDM signal and with a period of N (N is integer two or more) OFDM symbols, and
the estimator is configured to generate N pieces of first distortion estimated values corresponding to each N OFDM symbols.

9. The receiver according to claim 8, wherein the OFDM signal is configured so that a pilot signal of a k-th OFDM symbol is expressed by the following equation:

$P_{k,m}(n) = P_k(n+m) \bmod N$ where N is a period of a cyclic shift of the pilot subcarrier, and
the estimator is configured to generate an estimated value of a clock offset that is one of the phase offsets corresponding to N OFDM symbols, or corresponding to integral multiples of N, as the first estimated value.

10. The receiver according to claim 8, wherein the second estimated value is generated for each data subcarriers and pilot subcarriers of the received OFDM signal, and
the compensator is configured to compensate a carrier offset that is a phase offset estimated by using the second estimated value.

11. The receiver according to claim 8, wherein the second estimated value is generated for each data subcarriers and pilot subcarriers, and
the compensator is configured to compensate a clock offset that is a phase offset estimated by using the second estimated value.

12. The receiver according to claim 8, wherein the second estimated value is generated for each data subcarriers and pilot subcarriers, and
the compensator is configured to compensate a clock offset that is a phase offset estimated by using the second estimated value, and further compensate a carrier offset that is another phase offset estimated by phase errors of the data subcarriers and the pilot subcarriers, for each one OFDM symbol.

* * * * *